Figure 2:
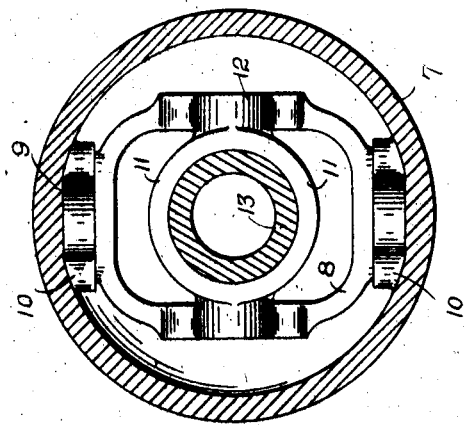

No. 835,076. PATENTED NOV. 6, 1906.
J. C. MARTIN, Jr.
CUP AND BALL JOINT.
APPLICATION FILED OCT. 26, 1904.

Witnesses:
Jesse R. Duff.
Wm. H. White.

Inventor:
Jesse C. Martin Jr.
By W. H. Smyth
His Atty.

UNITED STATES PATENT OFFICE.

JESSE C. MARTIN, JR., OF SAN FRANCISCO, CALIFORNIA.

CUP-AND-BALL JOINT.

No. 835,076.        Specification of Letters Patent.        Patented Nov. 6, 1906.

Application filed October 26, 1904. Serial No. 230,137.

*To all whom it may concern:*

Be it known that I, JESSE C. MARTIN, Jr., a citizen of the United States, residing in the city and county of San Francisco and State of California, have invented certain new and useful Improvements in Cup-and-Ball Joints; and I do hereby declare the following to be a full, clear, and exact description of the same.

This invention relates to a cup-and-ball joint, being an improvement in the class of ball-and-socket joints.

It has for its object a device of the character named better adapted than those heretofore to meet the increasingly trying conditions of practice which such constructions are called upon to encounter.

With low pressures the ordinary simple ball-and-socket joint performs its functions in a fairly satisfactory manner; but with the gradual adoption of increasingly high pressures the failure of the common ball-and-socket joint has become so pronounced as to bring about a prejudice among engineers against this otherwise valuable mechanical expedient. Many attempts have heretofore been made to provide ball-and-socket joints so constructed as to meet the difficulties suggested, but so far as I am aware with but imperfect results. One source of difficulty is that inherent in the nature of this type of connection—namely, the necessity for keeping one spherical surface in free though fluid-tight working contact with another under the adverse condition normally incident to the circumstances in which such joints are employed. With high pressures the difficulty involved in this matter has heretofore appeared to be almost insurmountable, for the reason that owing to the nature of the case the spherical surfaces are greater in extent than the surface of the threads by which the ball-joint is usually coupled to the line of pipe which it serves to unite. The consequence of this is that motion will occur in the thread connection in preference to movement of the joint in certain positions of its operation. This soon causes leaks and other more serious troubles. Another source of failure of these contrivances is the extremely arduous duty the wearing-surfaces are called upon to perform on account of the mutually antagonistic nature of the requirements involved. Under high pressures the ball is crowded to its socket-seat with great force, which thereby produces excessive friction between the sliding surfaces and requires a corresponding exercise of force to cause it to perform its swiveling action, with consequent rapid deterioration. This is a source of liability to failure and a fruitful cause of breakage.

To meet these stated difficulties, therefore, may be said to be another of the objects of the present invention.

In some forms of ball-and-socket joints, especially those of large size, attempts have been made to remove strains (other than those incident to the formation of a joint) from the ball-and-socket members by the addition of exterior link members. This, however, is highly objectionable, especially in ball-and-socket joints for small pipes, as these exterior members are liable to accidental injury and obstruct access to the device. I avoid these undesirable additions and accomplish the stated objects by means of the devices illustrated in the accompanying drawings, in which—

Figure 3:
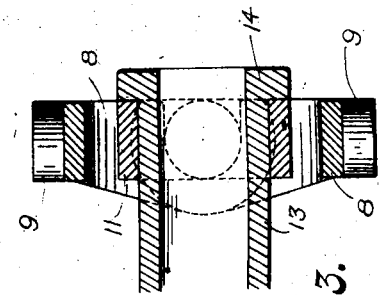
Figure 1:
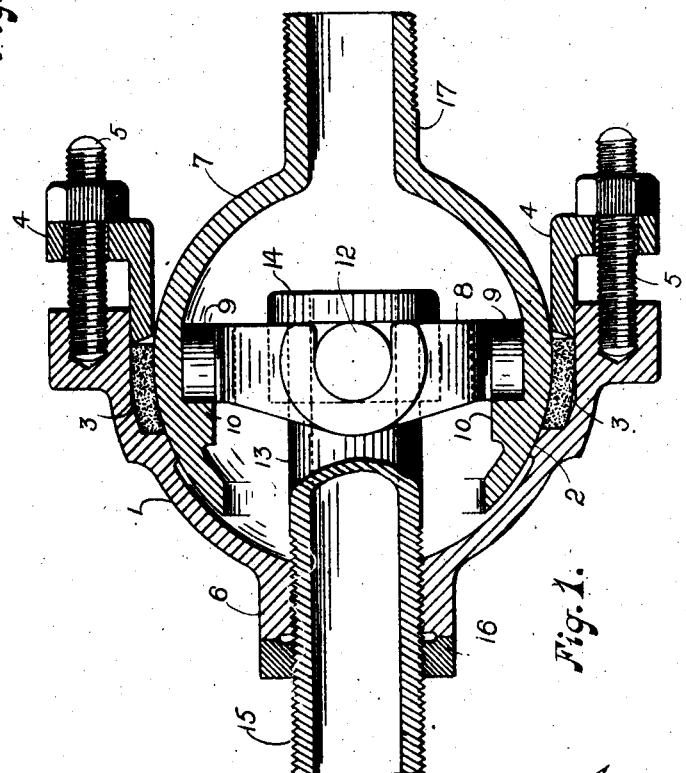

Figure 1 is a sectional view. Fig. 2 is a transverse section. Fig. 3 is a sectional detail showing the gimbal yoke or ring and journaled collar in working relation to each other, but removed from the ball member.

Referring to the drawings, 1 is a cup or socket member provided with a joint-surface 2 and a packing-recess 3.

4 is a gland adapted to enter the recess 3, and it is provided with suitable means for causing it to follow up the packing in the recess 3, shown in the present instance as threaded studs 5, with their nuts.

Socket 1 is also provided with suitable means for attaching it in a pipe-line or other situation, shown in the present instance as an internally-threaded boss 6.

7 is a ball member. Pivotally secured within the member 7 is a gimbal yoke or ring 8, shown in the present instance as provided with trunnions 9, seated in bearings 10 on the inner surface of the ball member 7. To complete the gimbal, the yoke 8 is pivotally associated with another member, shown in the present instance as a collar 11, provided with trunnions 12, seated in the yoke 8, their axes transverse to the yoke-pivot. Suitable connection is made between the trunnions 12 and the socket member 1 to provide for maintaining these last-mentioned trunnions in proper working relation. This is shown in the figures as consisting of an inwardly-projecting pipe 13, upon which the collar 11 is loosely journaled. The pipe 13 is provided with a stop or shoulder 14, against which the collar 11 bears, said pipe with its shoulder constituting a tubular abutment for the gimbal. End adjustment may be provided for in the pipe 13. This is shown in Fig. 1 as threads 15 upon the pipe adapted to engage with the internally-threaded boss 6 and a lock-nut 16 to secure it in its adjusted position. Suitable means are provided for attaching the ball member 7 in a pipe-line or other situation, shown in the present instance as a threaded boss 17.

It will be seen from the construction that all strains incident to the universally-movable character of this joint are removed from the ball-and-socket portions and are taken up on the internal gimbal, leaving to the ball and socket only its proper and specific function of a fluid-tight joint. This function of the gimbal permits, as may be seen in Fig. 1, of the socket portion of the joint terminating short of the large diameter of the ball, constituting it a cup rather than a socket, as customarily understood in this connection. The action of this joint under pressure, therefore, is the reverse of the ordinary type of ball-and-socket joint in that internal pressure tends to relieve pressure upon the contacting surfaces of the ball-and-socket members. Internal pressure tends to force the ball and socket apart, and by the construction illustrated strains incident thereto are transferred from the joint-surfaces, where they do not belong and where they are a detriment, to trunnion and bearing surfaces whose proper and legitimate function it is to receive and withstand them. The joint friction is thus reduced to a minimum without affecting other than beneficially the functions of the device.

What I claim is—

1. A connection for pipes or the like comprising a flexible fluid-tight member inclosing a universally-rotatable connecting-gimbal, said gimbal rotating with a portion of said flexible fluid-tight member.

2. A connection for pipes or the like comprising an endwise-adjustable connecting-gimbal inclosed within a metallic flexible fluid-tight conveyer member.

3. A flexible connection for pipes or the like comprising a movable fluid-tight conveyer member, a universally-movable connecting member, within the conveyer member, having a tubular abutment adapted to engage with the conveyer member.

4. A flexible connection for pipes or the like comprising a movable metallic fluid-tight conveyer member, a universally-movable connecting member, within the conveyer member, having a tubular abutment adapted to engage with the conveyer member.

5. A flexible connection for pipes or the like comprising a ball-and-socket joint, a universally-movable connecting member, within the ball-and-socket joint, having a tubular abutment adapted to engage with the ball-and-socket joint.

6. A flexible connection for pipes or the like comprising an axially-rotatable connecting-gimbal inclosed within a flexible fluid-tight conveyer member, said gimbal rotating with a portion of said flexible fluid-tight conveyer member.

7. A flexible connection for pipes or the like comprising an axially-rotatable connecting-gimbal inclosed within a metallic flexible fluid-tight conveyer member, said gimbal rotating with a portion of said conveyer member.

8. A flexible connection for pipes or the like comprising an axially-rotatable connecting-gimbal inclosed within a ball-and-socket joint, said gimbal rotating with one of the members of the ball-and-socket joint.

9. A flexible connection for pipes or the like comprising a cup or socket member, a ball member having operative contact therewith and projecting beyond its full diameter and an internal connecting device provided with a conduit therethrough at substantially the central portion thereof.

10. A flexible connection for pipes or the like comprising a cup or socket member, a ball member having operative contact therewith and projecting beyond its full diameter, an internal connecting device provided with a conduit extending through the central portion thereof, and joint-packing means between the two members.

11. A flexible connection for pipes or the like comprising a cup or socket member, a ball member having operative contact therewith and projecting beyond its full diameter, an internal connecting device provided with a conduit extending through the central part thereof, and a stuffing box or gland between the two members.

12. A flexible connection for pipes or the like comprising a cup or socket member, a ball member having operative contact therewith and projecting beyond its full diameter and a universally-movable connecting device provided with a conduit extending through the central part thereof.

13. A flexible connection for pipes or the like comprising a cup or socket member, a ball member having operative contact therewith and projecting beyond its full diameter, a universally-movable connecting device provided with a conduit extending through the central part thereof, and joint-packing means between the two members.

14. A flexible connection for pipes or the like comprising a cup or socket member, a ball member having operative contact therewith and projecting beyond its full diameter, a universally-movable connecting device provided with a conduit extending through the central part thereof, and a stuffing box or gland between the two members.

15. A connection for pipes or the like comprising a cup or socket member, a ball member having operative contact therewith and projecting therefrom beyond its full diameter and a rotatable gimbal adapted to hold the parts in operative association, said gimbal rotating with one of said members.

16. A connection for pipes or the like comprising a cup or socket member, a ball member having operative contact therewith and projecting therefrom beyond its full diameter, a rotatable gimbal adapted to hold the parts in operative association and joint-packing means between the two members, said gimbal rotating with one of said members.

17. A connection for pipes or the like comprising a cup or socket member, a ball member having operative contact therewith and projecting therefrom beyond its full diameter, a rotatable gimbal adapted to hold the parts in operative association and a stuffing box or gland between the two members, said gimbal rotating with one of said members.

18. A flexible connection for pipes or the like comprising a ball-and-socket joint, an endwise-adjustable gimbal connecting the ball and socket.

19. A flexible connection for pipes or the like comprising a ball-and-socket joint provided with suitable joint-packing and an endwise-adjustable gimbal connecting the ball and socket.

JESSE C. MARTIN, Jr.

Witnesses:
   JESSE R. EOFF,
   D. B. RICHARDS.